US009442684B2

(12) United States Patent
Asai

(10) Patent No.: US 9,442,684 B2
(45) Date of Patent: Sep. 13, 2016

(54) NON-TRANSITORY COMPUTER-READABLE STORAGE MEDIUM STORING COMPUTER PROGRAM, DEVICE, AND METHOD FOR INFORMATION PROCESSING DEVICE WITH A PLURALITY OF COMMUNICATION INTERFACES

(71) Applicant: BROTHER KOGYO KABUSHIKI KAISHA, Nagoya, Aichi (JP)

(72) Inventor: Norihiko Asai, Tajimi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/751,784

(22) Filed: Jun. 26, 2015

(65) Prior Publication Data
US 2015/0378654 A1 Dec. 31, 2015

(30) Foreign Application Priority Data
Jun. 27, 2014 (JP) .................................. 2014-132554

(51) Int. Cl.
| | |
|---|---|
| G06F 3/12 | (2006.01) |
| H04W 8/22 | (2009.01) |
| H04N 1/00 | (2006.01) |
| H04W 84/12 | (2009.01) |
| H04W 88/04 | (2009.01) |
| H04W 88/06 | (2009.01) |

(52) U.S. Cl.
CPC ........... *G06F 3/1236* (2013.01); *G06F 3/1204* (2013.01); *G06F 3/1224* (2013.01); *G06F 3/1292* (2013.01); *H04N 1/00204* (2013.01); *H04W 8/22* (2013.01); *H04N 2201/0055* (2013.01); *H04N 2201/0094* (2013.01); *H04W 84/12* (2013.01); *H04W 88/04* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2005/0018236 | A1 | 1/2005 | Shirai et al. | |
| 2012/0257245 | A1* | 10/2012 | McCoog | G06F 3/1204 358/1.15 |
| 2013/0148161 | A1* | 6/2013 | Park | G06F 3/1296 358/1.15 |

FOREIGN PATENT DOCUMENTS

JP     2005-044080 A     2/2005

* cited by examiner

*Primary Examiner* — Paul F Payer
(74) *Attorney, Agent, or Firm* — Scully, Scott, Murphy & Presser, P.C.

(57) ABSTRACT

An information processing device may select a communication target device that is to communicate with the information processing device. The information processing device may store received first communication device identification information in the storage in a case that the first communication device identification information is received. The information processing device may store received second communication device identification information in the storage in a case that the second communication device identification information is received. The information processing device may perform the communication with the communication target device in a case that particular first communication device identification information is stored in the storage. The information processing device may perform the communication with the communication target device in a case that only the particular second communication device identification information is stored in the storage but the particular first communication device identification information is not stored in the storage.

12 Claims, 8 Drawing Sheets

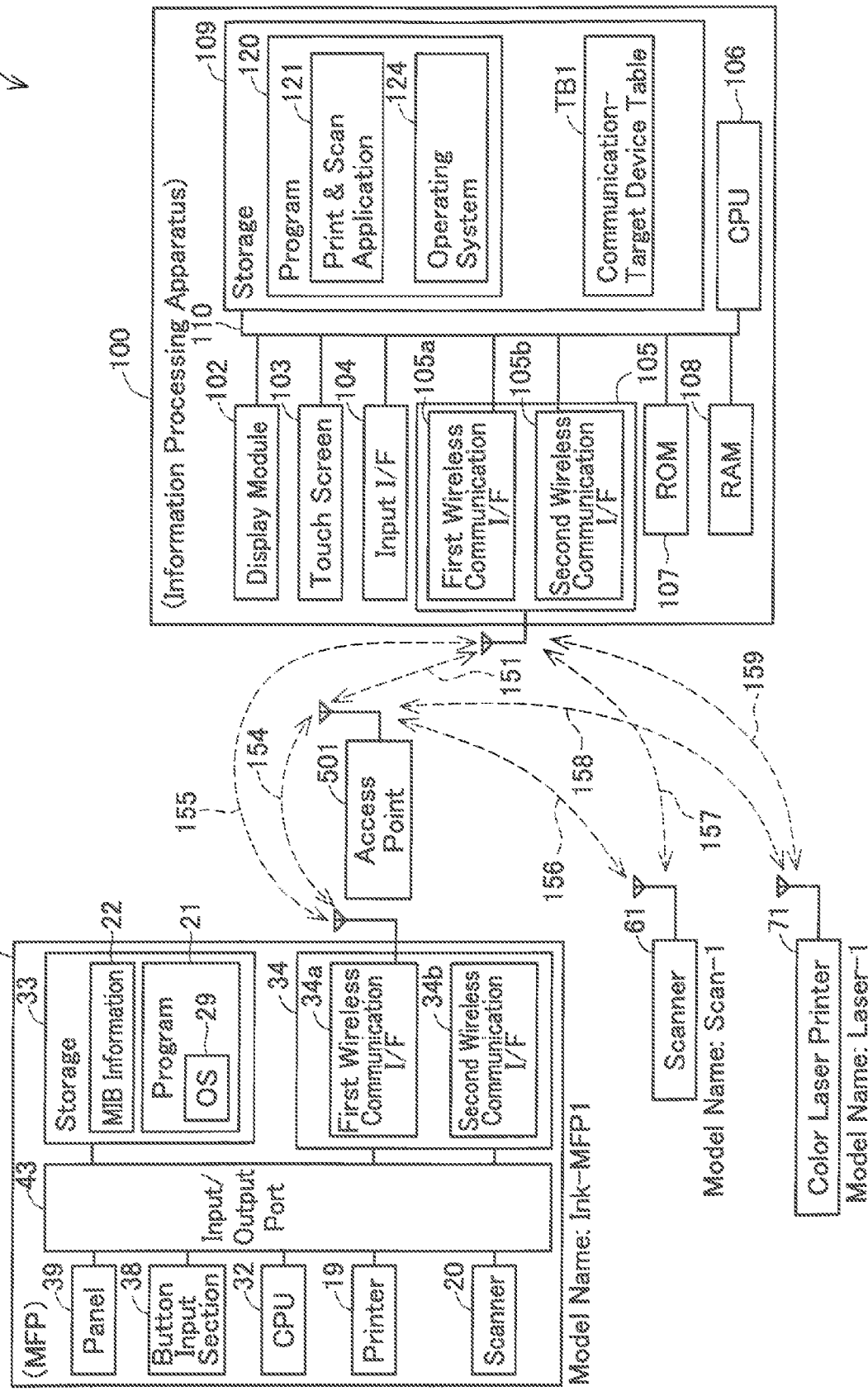

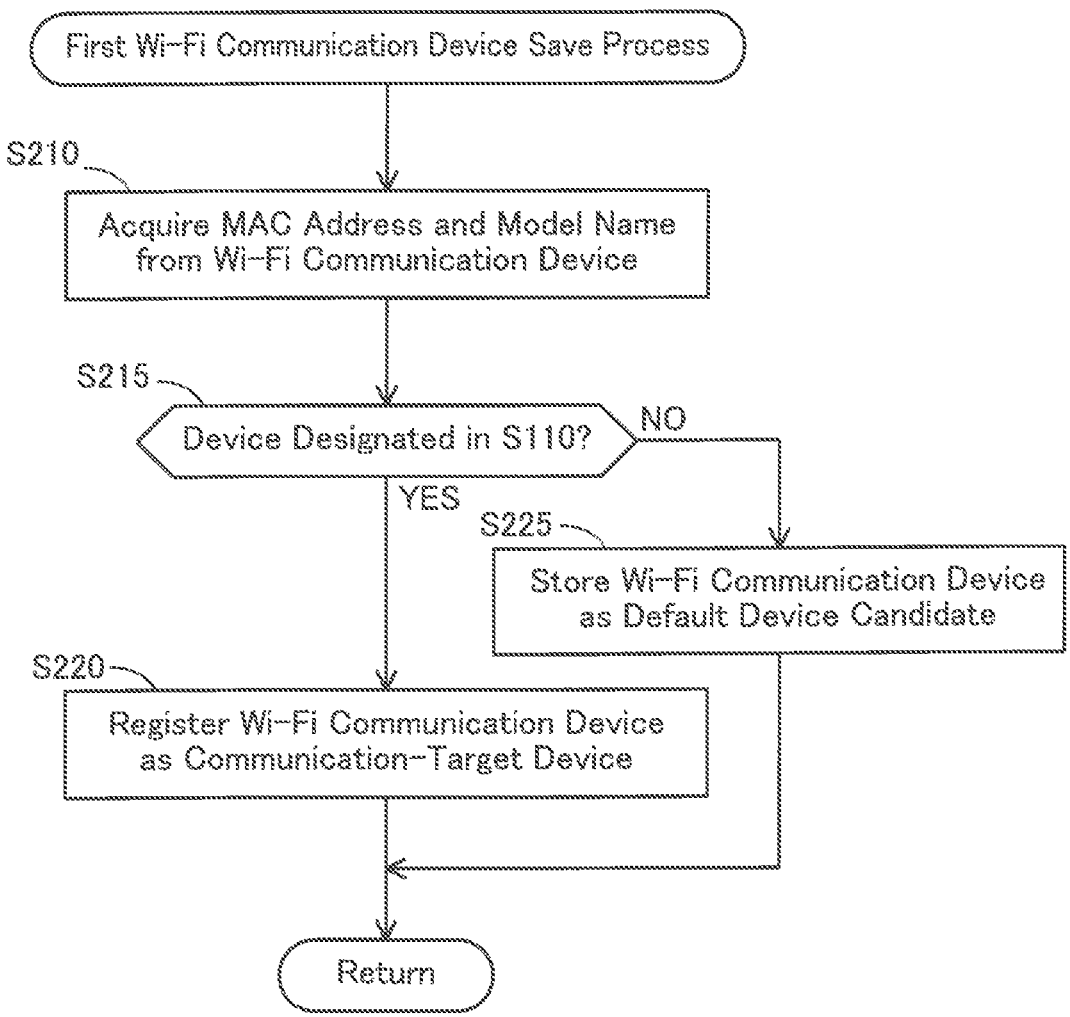

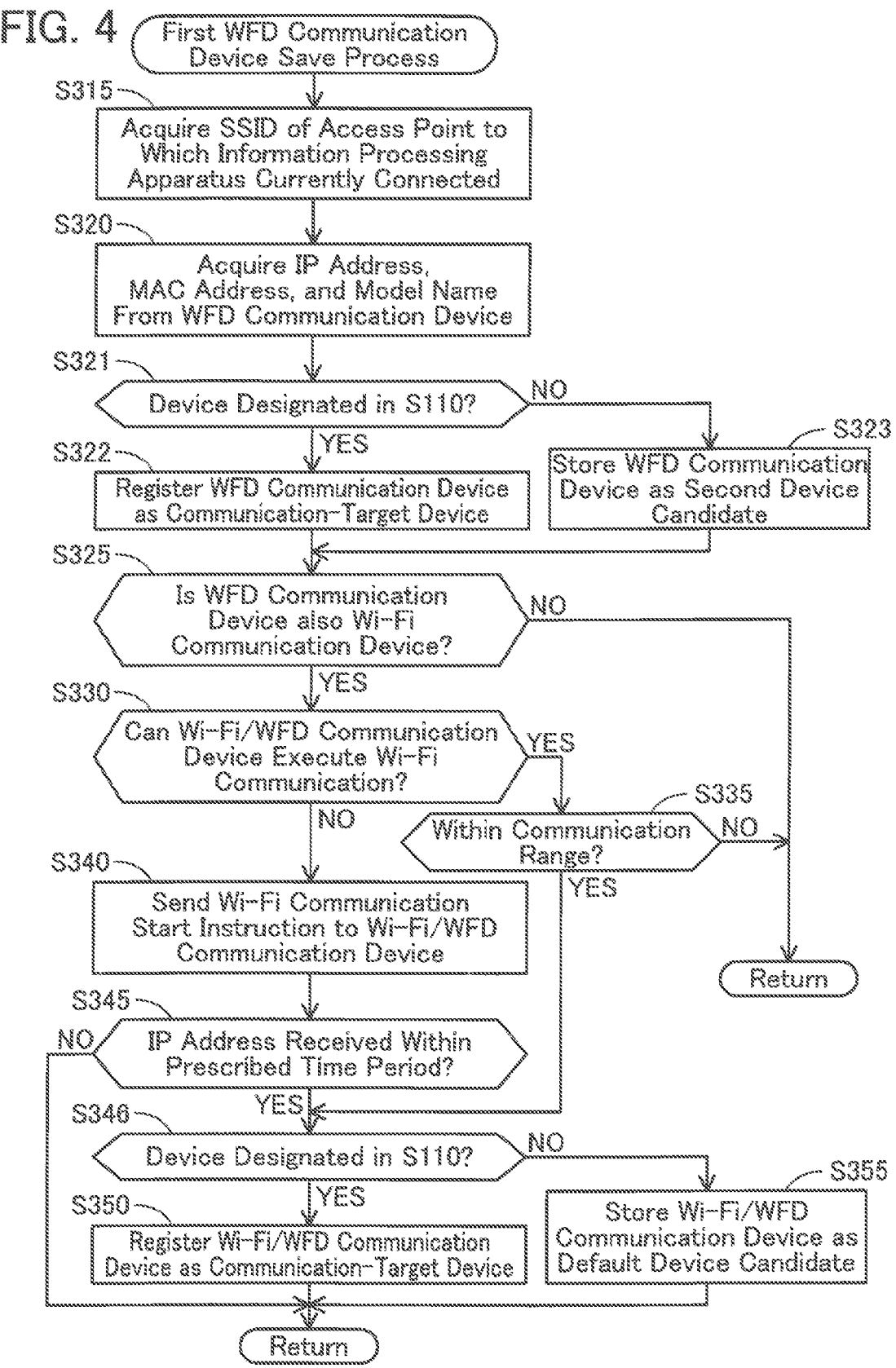

FIG. 6

| | | Default Device Storage Area | | | Second Device Storage Area | | | | |
|---|---|---|---|---|---|---|---|---|---|
| | Model Name | IP Address | MAC Address | | Model Name | IP Address | SSID | Device ID | MAC Address |
| Photo Printing | Ink-MFP1 | 211.9.36.148 | O-O-O-O-O-O | | Ink-MFP1 | 211.9.36.148 | SSID-1 | ABCDE | O-O-O-O-O-O |
| Web Printing | Laser-1 | 211.9.36.154 | x-x-x-x-x-x | | - | - | - | - | - |
| Scan | - | - | - | | Scan-1 | 211.9.36.132 | SSID-1 | JKELM | △-△-△-△-△-△ |

US 9,442,684 B2

NON-TRANSITORY COMPUTER-READABLE STORAGE MEDIUM STORING COMPUTER PROGRAM, DEVICE, AND METHOD FOR INFORMATION PROCESSING DEVICE WITH A PLURALITY OF COMMUNICATION INTERFACES

CROSS-REFERENCE TO RELATED APPLICATIONS

This application claims priority to Japanese Patent Application No. 2014-132554, filed on Jun. 27, 2014, the contents of which are hereby incorporated by reference into the present application.

TECHNICAL FIELD

The technology disclosed in this specification relates to an information processing apparatus or the like for communicating with devices.

DESCRIPTION OF RELATED ART

Conventionally, a user installs a driver into a personal computer (referred to as PC) or other such information processing apparatus, selects default printer, and stores the default printer IP address in the PC. When the user instructs the PC to print, the PC uses the stored IP address to send the print data to the default printer. Technology for performing data communications between an information processing apparatus and a device such as a printer like this is known.

SUMMARY

However, when the information processing apparatus is provided with two or more types of communication interfaces, there are cases where it is possible to communicate with a default device using a plurality of communication paths. In cases like this, user-friendliness may be lost when the communication path used when communicating with the default device is not selected properly.

One technique disclosed in the present application is a non-transitory computer-readable storage medium storing a computer program for an information processing device configured to communicate with a plurality of devices. The information processing device may comprise: a first wireless communication interface configured for communication in accordance with a first communication standard; a second wireless communication interface configured for communication in accordance with a second communication standard that is different from the first communication standard; a storage; an operation unit; and one or more processors. The computer program may include instructions for causing the one or more processors of the information processing device to perform receiving, via the first wireless communication interface, in a case that first communication device identification information is transmitted from a first communication device, the first communication device identification information for identifying the first communication device that can be communicated using the first wireless communication interface. The computer program may cause the one or more processors to perform receiving, via the second wireless communication interface, in a case that second communication device identification information is transmitted from a second communication device, the second communication device identification information for identifying the second communication device that can be communicated using the second wireless communication interface. The computer program may cause the one or more processors to perform storing the received first communication device identification information in the storage in a case that the first communication device identification information is received. The computer program may cause the one or more processors to perform storing the received second communication device identification information in the storage in a case that the second communication device identification information is received. The computer program may cause the one or more processors to perform selecting a communication target device that is to communicate with the information processing device from among the plurality of devices. The computer program may cause the one or more processors to perform accepting, via the operation unit, an execution instruction for executing a process for performing a communication of data with the communication target device. The computer program may cause the one or more processors to perform performing the communication with the communication target device via the first wireless communication interface in a case that particular first communication device identification information is stored in the storage. The particular first communication device identification information may be the first communication device identification information of the first communication device that is the selected communication target device. The computer program may cause the one or more processors to perform performing the communication with the communication target device via the second wireless communication interface in a case that only the particular second communication device identification information is stored in the storage but the particular first communication device identification information is not stored in the storage. The particular second communication device identification information may be the second communication device identification information of the second communication device that is the selected communication target device.

BRIEF DESCRIPTION OF DRAWINGS

FIG. 1 is a block diagram showing a configuration of a network; FIG. 3 shows a flowchart explaining save process for a first Wi-Fi communication device; FIG. 4 shows a flowchart explaining save process for a first WFD communication device; FIG. 6 is a diagram showing an example of a communication-target device table.

EMBODIMENT

Figure 2A:
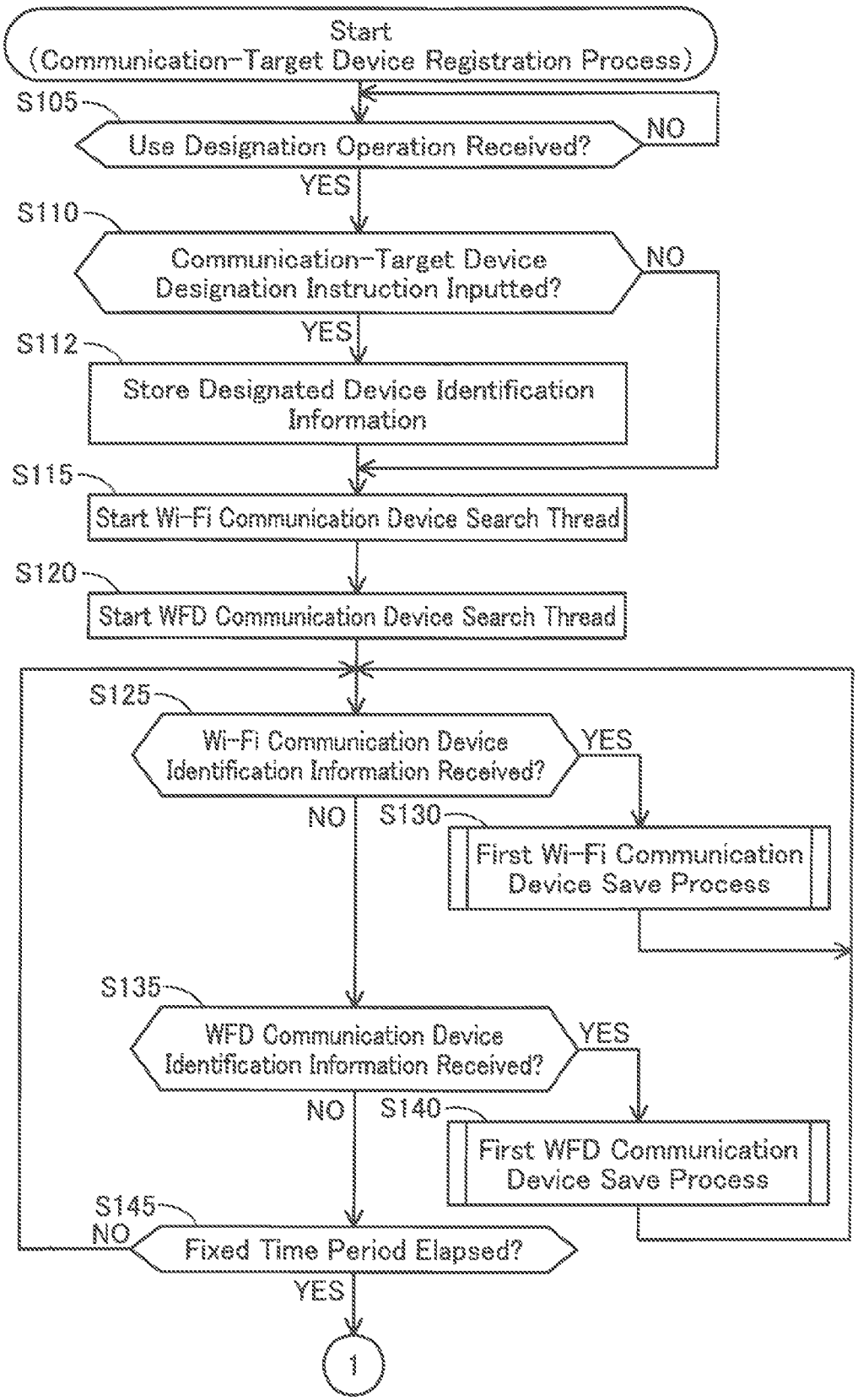
FIG. 2A is a flowchart explaining processing for a CPU to control respective parts according to an application.

<First Embodiment> <Configuration of Network 10>
FIG. 1 is a block diagram showing a configuration of a network 10. The network 10 comprises an information processing apparatus 100, an MFP 51, a scanner 61, a color laser printer 71, and an access point 501. Here, an MFP refers to a multifunction peripheral comprising a printing function, a scan function, and a copy function.

A wireless LAN_I/F 105 of the information processing apparatus 100 is provided with a first wireless communication I/F 105a and a second wireless communication I/F 105b. The first wireless communication I/F 105a complies with the Wi-Fi (registered trademark of the Wi-Fi Alliance) protocol, and is an interface for performing Wi-Fi access point and other such wireless communications between devices via a relay device. In the present specification, a communication executed using the first Wi-Fi wireless communication I/F 105a is defined as "Wi-Fi communication". With a Wi-Fi communication, it is possible to communicate with a communication-destination device using an IP address. Furthermore, with Wi-Fi communication, it is also possible to communicate with a communication-destination device using information for identifying the communication-destination device and/or a MAC address. The first wireless communication I/F 105a can perform a Wi-Fi communication with a first wireless communication I/F 34a of the MFP 51 via a wireless communication 151, the access point 501, and a wireless communication 154. The first wireless communication OF 105a can also perform a Wi-Fi communication with the scanner 61 via the wireless communication 151, the access point 501, and a wireless communication 156. The first wireless communication I/F 105a can also perform a Wi-Fi communication with the color laser printer 71 via the wireless communication 151, the access point 501, and a wireless communication 158.

Alternatively, the second wireless communication I/F 105b complies with the Wi-Fi Direct (described as WFD hereinbelow) protocol, and is an interface for performing a wireless communication between one device and another device, which functions as a Wi-Fi Direct relay device, without going through a relay device. In the present specification, a communication executed using the second wireless communication I/F 105b is defined as "WFD communication". With a WFD communication, it is also possible to communicate with a communication-destination device using information for identifying the communication-destination device (e.g.: a device ID) and/or a MAC address. Furthermore, with a WFD communication, it is also possible to communicate with a communication-destination device using an IP address. The second wireless communication I/F 105b can perform wireless communications 155, 157, and 159 in the WFD mode directly with each of the MFP 51, the scanner 61, and the color laser printer 71. Note that, with WFD communication and Wi-Fi communication, the wireless communication is conducted based on the 802.11 standard of The Institute of Electrical and Electronics Engineers, inc. (referred to as IEEE), and equivalent standards (for example, 802.11a, 11b, 11g, 11n or the like).

The second wireless communication I/F 105b may be configured to be used at a lower priority than the first wireless communication I/F 105a. This is because there are cases in which Wi-Fi communication provides advantages over WFD communication, such as lower power consumption and the ability to communicate simultaneously with a large number of devices. The present invention is not limited to a configuration where the first wireless communication I/F 105a and the second wireless communication I/F 105b are two physically separate interfaces. The concept includes a single interface physically functioning as either the first wireless communication I/F 105a or the second wireless communication I/F 105b in accordance with software support.

The access point 501 is a device that functions as a Wi-Fi access point, and has a service set identifier (also referred to as SSID). The SSID is a name for identifying the access point 501. The information processing apparatus 100 can send a print request or a scan request to the MFP 51, the scanner 61, and the color laser printers 71 based on communication via the wireless LAN_I/F 105 by executing a print & scan application 121.

<Configuration of Information Processing Apparatus 100>

The information processing apparatus 100 is, for example, a portable device such as a portable phone or a portable terminal device. The information processing apparatus 100 comprises a display module 102, a touch screen 103, an input I/F 104, a wireless LAN_I/F 105, an NFC I/F 112, a central processing unit (referred to as CPU) 106, a read only memory (referred to as ROM) 107, a random access memory (referred to as RAM) 108, and a storage 109. These elements are mutually connected via an I/O port 110.

The display module 102 receives an image signal output from the CPU 106, and displays an image based on the received image signal. As the display module 102, for example, an LCD or an organic EL display may be used. The touch screen 103 is made from a transparent member, and disposed so as to cover a surface of the display module 102. The touch screen 103 detects a position that was touched by a user's finger or the like, and outputs the detected position information to the CPU 106. The input I/F 104 is, for example, an operation button. The wireless LAN _I/F 105 is an interface for executing a wireless communication in the wireless LAN mode.

The CPU 106 executes programs stored in the storage 109. The RAM 108 temporarily stores information required for processing to be performed by the CPU 106. The storage 109 is configured by combining a flash memory, a hard disk (referred to as HDD), a buffer of the CPU 106, and so on. The storage 109 can store image data, document data, and the like. The storage 109 stores a program 120. The program 120 includes the print & scan application 121 (hereinafter indicated as the application 121), and an operating system 124 (hereinafter referred to as the OS 124). The CPU 106 executes processing according to the program 120.

The storage 109 may be a computer readable storage medium. The computer readable storage medium is a non-transitory medium, such as a ROM, RAM, flash memory, hard disk, etc. A ROM, RAM, flash memory, hard disk, etc. are tangible mediums. An electrical signal carrying a program to be downloaded from a server, etc. on the Internet is not included in the non-transitory medium.

The application 121 is an application for causing the CPU 106 to execute processing such as sending a printing command from the information processing apparatus 100 to the MFP 51 or the like. The OS 124 is a program that provides basic functions and is commonly used by the application 121 and the like. The OS 124 includes programs and the like for conducting a wireless communication with the wireless LAN_I/F 105. Moreover, the OS 124 is a program for the respective programs to acquire information that was acquired by the various types of hardware or for providing an application programming interface (referred to as API) for the respective programs to give commands to the various types of hardware.

Moreover, the storage 109 stores a communication-target device table TB1. The communication-target device table TB1 is a table for storing various information for identifying a communication-target device. The communication-target device is a device that is set forth each use. The communication-target device is a device that is preferentially used among a plurality of devices when such a plurality of devices capable of executing processing pertaining to a certain use exists. The communication-target device may be referred to as a default device or a second device depending on the difference in the communication path that is used. The default device is the communication-target device for communicating using a Wi-Fi communication via the first wireless communication I/F 105*a*. The second device is the communication-target device for communicating using a WFD communication via the second wireless communication I/F 105*b*. That is, the default device and the second device are the same device that is using a different communication path.

FIG. 6 shows an example of the communication-target device table TB1. The communication-target device table TB1 is provided with a default device storage area 800 and a second device storage area 810 for each of three types of uses, i.e. photo printing 611, web printing 612, and a scan 613. Information for identifying each of a default device and a second device that has been configured for photo printing is stored in the default device storage area 800 and the second device storage area 810 for photo printing 611 use, respectively. With photo printing, the information processing apparatus 100 sends a JPEG, a Bitmap, a GIF or other such image data print request to a device that has a printing function, and processing that causes the device to execute printing is performed. Information for identifying each of a default device and a second device that has been configured for web printing is stored in the default device storage area 800 and the second device storage area 810 for web printing 612 use, respectively. With web printing, the information processing apparatus 100 sends a web page print request to a device that has a printing function, and processing that causes the device to execute printing is performed. Information for identifying each of a default device and a second device that has been configured for scanning is stored in the default device storage area 800 and the second device storage area 810 for scan 613 use, respectively. With a scan, the information processing apparatus 100 sends a scan request to a device that has a scanning function, and processing that causes the device to execute scanning is performed.

A model name 801, an IP address 803, and a MAC address 806 are stored in the default device storage area 800 as information related to a default device. Furthermore, a model name 811, an IP address 813, an SSID 814, a device ID 815, and a MAC address 816 are stored in the second device storage area 810 as information related to a second device.

Each of the model names 801 and 811 is information for identifying each type of device. In a first embodiment, the model name 801 for the MFP 51 is "Ink-MFP1". The model name 801 for the scanner 61 device is "Scan-1". The model name 801 for the color laser printer 71 device is "Laser-1".

Each of the IP addresses 803 and 813 is an identification number that is allocated to each device and used in Wi-Fi communication. Each of the MAC addresses 806 and 816 is a physical address for identifying each device. Each of the MAC address 806 and 816 can be used as information for executing a WFD communication with a default device. The SSID 814 is identification information for identifying an access point to be used when executing a Wi-Fi communication with a default device. The device ID 815 is identification information that is allocated to each device and used in a WFD communication.

In the example of the communication-target device table TB1 shown in FIG. 6, when device capable of executing processing related to the use of the photo printing 611 exists in a plurality with regard to that use, it can be seen that the MFP 51 is set as the device that is preferentially used among the plurality of devices. For example, in the present case, the MFP 51 and the color laser printer 71 are available for the use of the photo printing 611.

<Configuration of MFP 51>

The configuration of the MFP 51 is now explained. The MFP 51 mainly comprises a CPU 32, a storage 33, a wireless LAN_I/F 34, a button input section 38, a panel 39, a printer 19, and a scanner 20. The wireless LAN_I/F 34 is provided with a first wireless communication I/F 34*a* and a second wireless communication I/F 34*b*. The first wireless communication I/F 34*a* is an interface for executing a Wi-Fi communication. The second wireless communication I/F 34*b* is an interface for executing a WFD communication. These constituent elements are mutually communicable via an I/O port 43.

The CPU 32 executes a program 21 stored in the storage 33. The storage 33 is configured by combining a RAM, a ROM, a flash memory, an hard disk (referred to as HDD), a buffer of the CPU 32, and so on. As with the storage 109, the storage 33 may be a computer readable storage medium. The storage 33 stores the program 21 and MIB information 22. The program 21 includes an OS 29 and the like.

MIB information 22 is information related to the MFP 51 itself, and is exported to an external apparatus such as the information processing apparatus 100. The external apparatus can acquire the MIB information 22 from the MFP 51 in accordance with a request from the external apparatus. The MIB information 22 includes a model name, a MAC address, Wi-Fi status information, SSID historical information, an IP address, and so forth. The model name is information for identifying the MFP 51. In the present embodiment, the model name is "Ink-MFP1". The MAC address is the physical address for identifying the MFP 51. The Wi-Fi status information is various information related to a Wi-Fi communication. The Wi-Fi status information includes information as to whether or not a power source for the first wireless communication I/F 34*a* is ON, and information showing an access point that exists within the communication range of the first wireless communication I/F 34*a*, for example. The SSID historical information shows the SSID of an access point where the MFP 51 had been connected in the past. The IP address is information for identifying the MFP 51.

The button input section 38 is a key for executing the respective functions of the MFP 51. The button input section 38 may also be configured integrally, as a touch screen, with the panel 39. The panel 39 displays the various types of functional information of the MFP 51. The printer 19 is a portion for executing printing using the image data stored in the storage 33. The scanner 20 is a portion for executing reading.

<Points to be Noted Regarding Descriptions in Present Specification>

In the ensuing explanation, the CPU 106 to execute programs such as an application and an operating system is sometimes simply referred to by the program name. For example, the indication of "application" may mean "the CPU 106 that executes the application". In the present specification, the description "the CPU 106 of the information processing apparatus 100 receives various types of information" includes the technical meaning "the CPU 106 of the information processing apparatus 100 acquires various types of information via the wireless LAN_I/F 105". Further, the description "the CPU 106 of the information processing apparatus 100 transmits various types of information" includes the technical meaning "the CPU 106 of the information processing apparatus 100 outputs various types of information via the wireless LAN_I/F 105".

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information. However, the aforementioned distinction between "information" and "data" is not rigid, and exceptions to the rule are also allowed.

In the present specification, "data" and "information" before and after receiving a prescribed operation are regarded as the same data and information. For example, it is supposed that key information that is not encoded is stored in the storage, and that key information that has been encoded (written as "encoded key information" hereinbelow) has been received through the wireless LAN_I/F 105. In this case, when the key information stored in the storage matches decoded key information obtained by decoding the encoded key information, the key information, the encoded key information, and the decoded key information are all treated as the same "key information". The "prescribed operation" is not limited to encoding/decoding, and may be a hashing operation or the like.

<Communication-Target Device Registration Process>

Figure 2B:
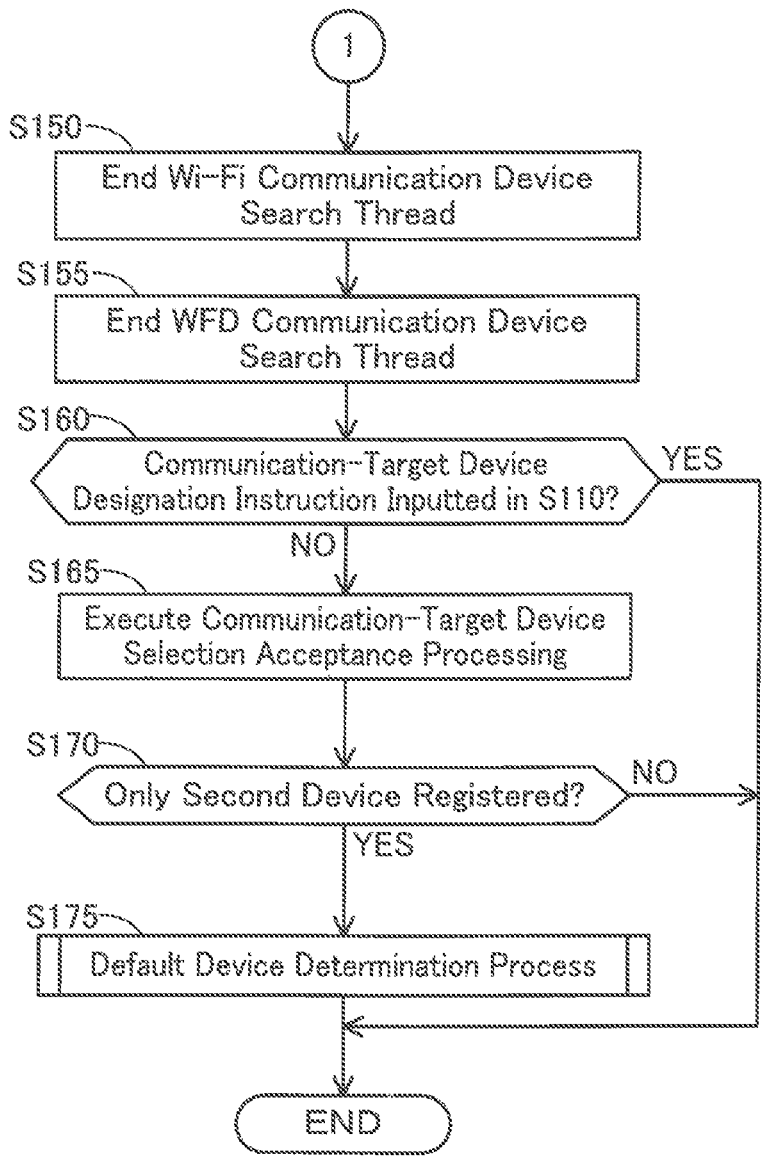
FIG. 2B is a flowchart explaining processing for a CPU to control respective parts according to an application.

Processing in which the CPU 106 controls various components in accordance with the application 121 will be explained below using FIGS. 2A to 4. The flow in FIGS. 2A and 2B is started in accordance with an execution instruction for a communication-target device registration process being inputted. The communication-target device registration process stores information related to a communication-target device in the communication-target device table TB1. The input of an execution instruction for the communication-target device registration process, for example, may be executed by a user touching a registration process execution button displayed on the display module 102.

In S105, the CPU 106 determines whether or not a use designation operation that designates any of the three types of uses, i.e. "photo printing", "web printing" or "scan", has been received. For example, the application 121, in the display module 102, displays an icon corresponding to each of the aforementioned three types of uses on the display module 102. Then, when a site where an icon is being displayed has been touched, the CPU 106 determines that the use denoted by the touched icon has been designated. The processing returns to S105 when the determination is negative (S105: NO), and proceeds to S110 when the determination is affirmative (S105: YES).

In S110, the CPU 106 determines whether or not a communication-target device designation instruction has been inputted. The communication-target device designation instruction is input by the user to designate a communication-target device. For example, the CPU 106 may cause the display on the display module 102 of a communication-target device designation screen for receiving a communication-target device designation. The configuration may be such that a list of the names of devices that were connected in the past may be displayed on the communication-target device designation screen, and the selection of any device may be accepted. Furthermore, identification information for identifying a device that was connected in the past may be stored in the storage 109 together with the device name. Examples of identification information are an IP address, a MAC address, and so forth. The configuration may also be such that an input column for the identification information for identifying the communication-target device may be displayed on the communication-target device designation screen, and the input of the relevant identification information may be accepted. The processing proceeds to S115 when the determination is negative (S110: NO), and proceeds to S112 when the determination is affirmative (S110: YES).

In S112, the CPU 106 temporarily stores identification information for identifying the device designated as the communication-target device in the storage 109 as designated device identification information.

In S115, the CPU 106 starts a Wi-Fi communication device search thread. The Wi-Fi communication device search thread is a program for determining whether or not a Wi-Fi communication device that is capable of communicating using the first wireless communication I/F 105*a* is included among a plurality of external devices (that is, the MFP 51, the scanner 61, and the color laser printer 71). Specifically, the CPU 106 broadcasts a packet to the plurality of external devices requesting that the external devices respond with identification information (e.g.: an IP address), and waits for the identification information responses from the external devices.

In S120, the CPU 106 starts a WFD communication device search thread. The WFD communication device search thread is a program for determining whether or not a WFD communication device that is capable of communicating using the second wireless communication I/F 105*b* is included among a plurality of external devices (that is, the MFP 51, the scanner 61, and the color laser printer 71). Specifically, the CPU 106 uses the second wireless communication I/F 105*b* to broadcast a packet requesting that the external devices respond with identification information (e.g.: an IP address). Then, the CPU 106 waits for the identification information responses from the external devices.

In S125, the CPU 106 determines whether or not Wi-Fi communication device identification information has been received. This determination may be made in accordance with whether or not an IP address has been received in response to the packet broadcast in the Wi-Fi communication device search thread (S115). When the determination is affirmative (S125: YES), the CPU 106 is able to determine that a Wi-Fi communication device is included among the plurality of external devices. Accordingly, the processing proceeds to S130.

In S130, the CPU 106 executes a first Wi-Fi communication device save process. The content of the first Wi-Fi communication device save process will be explained using FIG. 3.

In S210, the CPU 106 uses the IP address received in S125 to acquire information related to the Wi-Fi communication device from the relevant Wi-Fi communication device. The acquisition of information related to the Wi-Fi communication device is performed using the first wireless communication I/F 105*a*. The information related to the Wi-Fi communication device may be MIB information. In the present embodiment, a case in which the MAC address and the model name of the Wi-Fi communication device are acquired as the information related to the Wi-Fi communication device will be explained as an example.

In S215, the CPU 106 determines whether or not the device identified using the IP address received in S125 and the Wi-Fi communication device-related information acquired in S210 matches the communication-target device designated in S110. This determination is affirmative when the IP address included in the designated device identification information stored in S112 and the IP address received in S125 are a match, and is negative when these IP addresses do not match. Or, this determination is affirmative when the MAC address included in the designated device identification information and the MAC address acquired in S210 are a match, and is negative when these MAC addresses do not match. The information related to the Wi-Fi communication device received by the first wireless communication I/F 105a may be encoded, and the designated device identification information stored in the storage 109 may be encoded. When the determination in S215 is affirmative (S215: YES), the processing proceeds to S220.

In S220, the CPU 106 stores information that was received from the Wi-Fi communication device in the communication-target device table TB1. That is, the CPU 106 registers the Wi-Fi communication device as the communication-target device. This is another way of saying that the CPU 106 registers the Wi-Fi communication device as the default device. Register is the same as saying configure. Furthermore, this is the same as saying that the CPU 106 stores the Wi-Fi communication device in the communication-target device table TB1 as the communication-target device. Specifically, in the communication-target device table TB1 (FIG. 6), the CPU 106 selects the row corresponding to the use selected in S105 from among photo printing 611 to scan 613. Then, the CPU 106 writes the model name 801, the IP address 803, and the MAC address 806 of the device configured as the communication-target device to the default device storage area 800 in the selected row. This information was acquired in S125 and S210. For example, when photo printing 611 has been selected in S105, the IP address 803 and so forth are written in area R1 of FIG. 6. The processing then returns to S125 of FIG. 2A.

When the determination in S215 is negative (S215: NO), the processing proceeds to S225. In S225, the CPU 106 stores the IP address of the Wi-Fi communication device and the MAC address and model name of the Wi-Fi communication device in the storage 109 in a mutually associated manner. This makes it possible for the CPU 106 to store the Wi-Fi communication device as a default device candidate. The processing then returns to S125 of FIG. 2A.

Alternatively, when the determination in S125 of FIG. 2A is negative (S125: NO), the processing proceeds to S135. In S135, the CPU 106 determines whether or not identification information has been received for a WFD communication device. This determination may be made in accordance with whether or not a device ID has been received in response to the packet that was broadcast in the WFD communication device search thread (S120). When the determination is affirmative (S135: YES), the CPU 106 is able to determine that a WFD communication device is included among the plurality of external devices. Accordingly, the processing proceeds to S140.

In S140, the CPU 106 executes a first WFD communication device save process. The contents of the first WFD communication device save process will be explained using FIG. 4. In S315, the CPU 106 acquires from the OS 124 the SSID of the access point to which the information processing apparatus 100 is currently connected.

In S320, the CPU 106 uses the device ID acquired in S135 to acquire information related to the WFD communication device from the relevant WFD communication device. The acquisition of the information related to the WFD communication device is performed using the second wireless communication I/F 105b. The information related to the WFD communication device may be MIB information. This will be explained in detail. The CPU 106, via the second wireless communication I/F 105b, sends query information requesting the MIB information that the WFD communication device is storing. Then, the CPU 106 receives via the second wireless communication I/F 105b the MIB information returned in response to the query information. In the present embodiment, a case in which a model name, a MAC address, Wi-Fi status information, SSID historical information, and an IP address are acquired as the MIB information will be explained as an example. The Wi-Fi status information and the SSID historical information are only returned from a device that is capable of a Wi-Fi communication.

In S321, the CPU 106 determines whether or not the device identified using the device ID received in S135 and the WFD communication device-related information acquired in S320 matches the communication-target device designated in S110. This determination may be affirmative when the device ID included in the designated device identification information stored in S112 matches the device ID received in S135, and may be negative when these device IDs do not match. The content described above in S215 is also applicable in S321. When the determination in S321 is affirmative (S321: YES), the processing proceeds to S322.

In S322, the CPU 106 stores information received from the WFD communication device in the communication-target device table TB1. That is, the CPU 106 registers the WFD communication device as the communication-target device. Specifically, in the communication-target device table TB1 (FIG. 6), the CPU 106 selects the row corresponding to the use selected in S105 from among photo printing 611 to scan 613. Then, the CPU 106 writes the model name 811, the IP address 813, the SSID 814, the device ID 815, and the MAC address 816 of the device configured as the communication-target device to the second device storage area 810 in the selected row. This information was acquired in S135 and S320. Furthermore, the CPU 106 stores the Wi-Fi status information and the SSID historical information acquired in S320 in the storage 109. For example, when photo printing 611 has been selected in S105, the IP address 813 and so forth are written in area R2 of FIG. 6. The processing then proceeds to S325. The content described above in S220 is also applicable in S322.

When the determination in S321 is negative (S321: NO), the processing proceeds to S323. In S323, the CPU 106 stores the device ID of the WFD communication device, the IP address, the MAC address, and the model name of the Wi-Fi communication device in the storage 109 in a mutually associated manner This makes it possible for the CPU 106 to store the WFD communication device as a second device candidate. The processing then proceeds to S325.

In S325, the CPU 106 determines whether or not the WFD communication device is also a Wi-Fi communication device. In other words, a determination is made as to whether or not the device that was determined to be able to execute a WFD communication in S135 is also able to execute a Wi-Fi communication. This determination may be made in accordance with whether or not the Wi-Fi status information or the SSID historical information was acquired in S320. In a case that the determination is negative (S325: NO), the processing returns to S125 of FIG. 2A.

Alternatively, when a determination was made in S325 that the WFD communication device is also a Wi-Fi communication device (S325: YES), the processing proceeds to S330. Hereinafter, a device that is both a WFD communication device and a Wi-Fi communication device will be described as a Wi-Fi/WFD communication device. In S330, the CPU 106 determines whether or not a Wi-Fi/WFD communication device is in a state capable of executing a Wi-Fi communication. This determination is affirmative when: the Wi-Fi status information acquired in S320 shows that the Wi-Fi function of the Wi-Fi/WFD communication device is valid; and the SSID historical information includes the same SSID as the SSID acquired in S315. On the other hand, this determination is negative when at least one of these is not so. Furthermore, the determination may be affirmative when the Wi-Fi status information shows that the Wi-Fi function of the Wi-Fi/WFD communication device is valid regardless of the SSID historical information. This determination may be affirmative when the CPU 106 uses a Wi-Fi communication to send prescribed data to the Wi-Fi/WFD communication device and received returned data, and may be negative when the CPU 106 does not receive this returned data. An example of the prescribed data is a Ping packet complying with an ICMP (referred to as Internet Control Message Protocol). When the determination is affirmative (S330: YES), the processing proceeds to S335.

In S335, the CPU 106 determines whether or not the Wi-Fi/WFD communication device is within Wi-Fi communication range. This determination may be made in accordance with whether or not the CPU 106 attempted to communicate with the Wi-Fi/WFD communication device via the first wireless communication I/F 105a and was able to receive various information. The determination may also be made in accordance with whether or not the Wi-Fi status information acquired in S320 shows that a communication had been performed between the information processing apparatus and the Wi-Fi/WFD communication device. The processing returns to S125 of FIG. 2A when the determination is negative (S335: NO), and proceeds to S346 when the determination is affirmative (S335: YES).

Alternatively, when it has been determined in S330 that the Wi-Fi/WFD communication device is not able to execute a Wi-Fi communication (S330: NO), the processing proceeds to S340. In S340, the CPU 106 sends a Wi-Fi communication start instruction to the Wi-Fi/WFD communication device. The Wi-Fi communication start instruction is information for instructing the Wi-Fi/WFD communication device to configure a device status that will enable the execution of a Wi-Fi communication.

In S345, the CPU 106, within a prescribed period of time after sending the Wi-Fi communication start instruction, determines whether or not the IP address of the Wi-Fi/WFD communication device has been received from the Wi-Fi/WFD communication device via a WFD communication. The prescribed period of time may be one second, for example. The processing returns to S125 of FIG. 2A when the determination is negative (S345: NO), and proceeds to S346 when the determination is affirmative (S345: YES).

In S346, the CPU 106 determines whether or not the Wi-Fi/WFD communication device and the communication-target device designated in S110 are a match. This determination is affirmative, for example, when the IP address included in the designated device identification information stored in S112 and the IP address of the Wi-Fi/WFD communication device are a match, and is negative when these IP addresses do not match. The content described above in S215 is also applicable in S346. When the determination in S346 is affirmative (S346: YES), the processing proceeds to S350.

In S350, the CPU 106 stores various information related to the Wi-Fi/WFD communication device in the default device storage area 800. That is, the CPU 106 registers the Wi-Fi/WFD communication device as the communication-target device. Since the specific process is the same as the processing content of S220 described above, an explanation will be omitted here. The processing then returns to S125 of FIG. 2A.

When the determination in S346 is negative (S346: NO), the processing proceeds to S355. In S355, the CPU 106 stores the IP address of the Wi-Fi/WFD communication device, and the MAC address and model name of the Wi-Fi/WFD communication device in the storage 109 in a mutually associated manner. This makes it possible for the CPU 106 to store the Wi-Fi/WFD communication device as a default device candidate. The processing then returns to S125 of FIG. 2A.

When the determination is negative in S135 of FIG. 2A (S135: NO), the processing proceeds to S145. In S145, the CPU 106 determines whether or not a fixed period of time has elapsed since starting the Wi-Fi communication device search thread or the WFD communication device search thread in S115 or S120. The processing returns to S125 when the determination is negative (S145: NO), and proceeds to S150 when the determination is affirmative (S145: YES).

In S150, the CPU 106 ends the Wi-Fi communication device search thread started in S115. In S155, the CPU 106 ends the WFD communication device search thread started in S120.

In S160, the CPU 106 determines whether the device designated in S110 is stored in the communication-target device table TB1 as either a default device or a second device. That is, the CPU 106 determines whether or not the device designated in S110 is registered as the communication-target device. When the determination is affirmative (S160: YES), the CPU 106 ends the processing, and when the determination is negative (S160: NO), the processing proceeds to S165.

In S165, the CPU 106 executes processing for accepting a communication-target device selection. A specific example will be explained. The CPU 106 displays a communication-target device selection screen on the display module 102. The communication-target device selection screen is for accepting the selection of a default device and/or a second device. A list of device names of devices stored as default device candidates in S225 and S355 is displayed on the communication-target device selection screen as default device selection candidates. Furthermore, a list of device names of devices stored as second device candidates in S323 is displayed on the communication-target device selection screen as second device selection candidates. Then, when any device from among the default device selection candidate devices has been selected, the CPU 106 configures the selected device as the default device. The contents of the processing for configuring the default device are the same as the contents described above in S220. Furthermore, when any device from among the second device selection candidate devices has been selected, the CPU 106 configures the selected device as the second device. The contents of the processing for configuring the second device are the same as the contents described above in S322.

In S170, the CPU 106 determines whether or not only a second device was registered in S165. In other words, the CPU 106 determines whether or not only a WFD communication device was selected in S165. When the determination is negative (S170: NO), the CPU 106 ends the processing, and when the determination is affirmative (S170: YES), the processing proceeds to S175.

In S175, the CPU 160 executes default device determination process. The default device determination process is for determining whether or not the second device registered in S165 is also a Wi-Fi communication device. Since the second device is none other than the WFD communication device, the default device determination process can also be called processing for determining whether or not the WFD communication device is also capable of executing a Wi-Fi communication. That is, the contents of the default device determination process are the same as the contents of S320 to S355 described above.

The registration of the communication-target device is complete as a result of the communication-target device registration process of FIG. 2A and FIG. 2B being completed. In accordance with this, only a device for which at least one of the default device and the second device has been stored in the communication-target device table TB1 is registered as the communication-target device.

<Image Processing>

Image processing will be explained using FIGS. 5A and 5B. In S810, the CPU 106 determines whether or not an input of a command to execute image processing has been accepted. This determination will be explained in detail. First, the CPU 106 accepts a use designation operation for designating any of the three types of uses of "photo printing", "web printing" or "scan", and displays an operation screen corresponding to each use. In a case that the accepted use is "photo printing" or "web printing", the CPU 106 acquires print-target data. Specifically, in the case of "photo printing", the CPU 106 either reads photo data that has been stored in the storage 109, or causes a not-shown camera section to take a photograph, and acquires photo data created by the photography. In the case of "web printing", the CPU 106 acquires web page data sent by a not-shown web server and received by the information processing apparatus 100. The acquired print-target data is displayed in a preview manner on the operation screen. Then, a command for executing the image processing pertaining to the selected use is inputted in accordance with the user touching a process execution button in the operation screen. The processing returns to S810 when the determination is negative (S810: NO), and proceeds to S815 when the determination is affirmative (S810: YES). In an example for explaining the present embodiment, a case in which a "photo printing" execution command has been inputted will be explained below.

In S815, the CPU 106 determines whether or not a default device (that is, a Wi-Fi communication device) is registered in the use "photo printing 611". This determination will be explained in detail. When information such as the IP address 803 is stored in the default device storage area 800 (Refer to area R1 of FIG. 6) in the photo printing 611 row of the communication-target device table TB1, a determination of affirmative is made in S815 (S815: YES). Alternatively, when information such as the IP address 813 is stored in the second device storage area 810 (Refer to area R2 of FIG. 6) without information such as the IP address 803 being stored in the default device storage area 800 (Refer to area R1 of FIG. 6) in the photo printing 611 row of the communication-target device table TB1, a determination of negative is made in S815 (S815: NO).

That is, when the IP address 813 and so forth are stored only in the second device storage area 810 (Refer to area R2 of FIG. 6) in the photo printing 611 row of the communication-target device table TB1, the communication-target device is determined to be the second device (that is, the WFD communication device). At this occasion, whether or not information used in S815 is stored only in the second device storage area 810 does matter. Here is a specific example, a case is assumed where: one information (e.g. an IP address of a communication target device) is stored in the default device storage area 800; and another information indicating that a communication target device is a WFD communication device is stored in the second device storage area 810. In this case, if the one information is not information used for the determination of S815, it is a state where the other information indicating that the communication target device is a WFD communication device is stored "only" in the storage 109 (e.g., the second device storage area 810).

When the determination in S815 is negative (S815: NO), the processing proceeds to S820. In S820, the CPU 106 communicates with the communication-target device using a WFD communication, and displays on the display module 102 the fact that photo printing is to be executed. For example, a character string such as "Photo printing to be executed using a WFD communication" may be displayed on the display module 102.

In S821, the CPU 106 sends query information to the communication-target device via the second wireless communication I/F 105b. The query information is for requesting the MIB information that is stored in the communication-target device. In S823, the CPU 106 receives the MIB information, that is sent in response to the query information, via the second wireless communication I/F 105b. In the present embodiment, a case in which a model name, a MAC address, Wi-Fi status information, SSID historical information, and an IP address are acquired as the MIB information will be explained as an example.

In S825, the CPU 106 determines whether or not the communication-target device is also a Wi-Fi communication device. In other words, the CPU 106 determines whether or not the WFD communication device is also capable of executing a Wi-Fi communication. This determination may be made in accordance with whether or not the same SSID as the SSID 804 in the photo printing 611 row of the communication-target device table TB1 was acquired in S823 as the SSID historical information. The processing proceeds to S875 when the determination is negative (S825: NO), and proceeds to S830 when the determination is affirmative (S825: YES).

The contents of the steps in S830 to S845 are the same as the contents of the steps in S330 to S345 of FIG. 4. Furthermore, the content of S850 is the same as the content of S350 of FIG. 4. Accordingly, explanations will be omitted here.

In S860, the CPU 106 determines whether or not the communication-target device is in a state that enables the execution of a Wi-Fi communication. The CPU 106 may perform this determination, by performing the same process as in S330, on the basis of the Wi-Fi status information acquired in S823. Furthermore, the CPU 106 may perform this determination, in the same way as S330, by sending the prescribed data to the communication-target device. An example of the prescribed data is a Ping packet. When the determination is affirmative (S860: YES), the processing proceeds to S865.

In S865, the CPU 106 displays on the display module 102 the fact that print processing will be executed on the communication-target device using a Wi-Fi communication. In S870, the CPU 106 sends print data to the communication-target device using a Wi-Fi communication. The CPU 106 may display a print execution button on the display module 102 at this time, and send the print data in response to the user having touched this print execution button. The CPU 106 then ends the processing.

Alternatively, when the determination in S860 is negative (S860: NO), the processing proceeds to S861. In S861, the CPU 106 determines whether or not the communication-target device is capable of executing a WFD communication. When the determination is negative (S861: NO), the CPU 106 ends the processing, and when the determination is affirmative (S861: YES), the processing proceeds to S875.

In S875, the CPU 106 displays on the display module 102 the fact that print processing is to be executed on the communication-target device using a WFD communication. In S880, the CPU 106 sends print data to the communication-target device using a WFD communication. The CPU 106 may display a print execution button on the display module 102 at this time, and may send the print data in response to the user having touched this print execution button. The CPU 106 then ends the processing.

<Effects of First Embodiment>

A case in which the MFP 51 is registered as the communication-target device will be explained as an example. Also, a case in which photo printing 611 is selected as the use will be explained. When the MFP 51 has been selected as the communication-target device (S110: YES or S165), and it has been determined that the MFP 51 is a Wi-Fi communication device (S125: YES), the IP address 803 and so forth are stored in the default device storage area 800 of the communication-target device table TB1 (Refer to area R1 of FIG. 6). This makes it possible for the CPU 106 to register the default device for photo printing 611 use. When the MFP 51 has been determined to be a WFD communication device (S135: YES), the IP address 813 and so forth are stored in the second device storage area 810 of the communication-target device table TB1 (Refer to area R2 of FIG. 6). This makes it possible for the CPU 106 to register the second device for photo printing 611 use. Then, when a photo printing execution command is inputted (S810: YES), a determination is made as to whether the default device or the second device is registered as the communication-target device (S815). Specifically, when the IP address 803 and other such information is stored in the default device storage area 800 (Refer to area R1 in FIG. 6) in the photo printing 611 row of the communication-target device table TB1, it is determined that the default device is registered (S815: YES). Therefore, the CPU 106 uses a Wi-Fi communication to send print data to the MFP 51, which is the communication-target device (S870). Alternatively, when the IP address 813 and other such information is stored only in the second device storage area 810 (Refer to area R2 of FIG. 6), it is determined that only the second device is registered (S815: NO). Therefore, the CPU 106 uses a WFD communication to send the print data to the MFP 51, which is the communication-target device (S880). This makes it possible for the CPU 106 to execute a communication with the communication-target device by automatically selecting the appropriate I/F from among the first wireless communication I/F 105a and the second wireless communication I/F 105b. Accordingly, user friendliness can be increased.

When it is determined that only the second device is registered as the communication-target device (S815: NO), the CPU 106 can send the communication-target device query information requesting the MIB information that the communication-target device is storing (S821), and can acquire the MIB information from the communication-target device (S823). Then, When it is determined that the communication-target device is also capable of executing a Wi-Fi communication (S825: YES), the CPU 106 can additionally store the default device as a communication-target device (S850). This makes it possible for the CPU 106 to execute communications with the communication-target device using the first wireless communication I/F 105a as much as possible.

When a communication-target device selection has been accepted (S165), and only the second device has been registered as the communication-target device (S170: YES), the CPU 106 can send the communication-target device query information requesting the MIB information that the communication-target device is storing, and can acquire the MIB information from the communication-target device (S175). Then, When it is determined that the communication-target device is also capable of executing a Wi-Fi communication, the CPU 106 can additionally store the default device as a communication-target device (S175). This makes it possible for the CPU 106 to execute communications with the communication-target device using the first wireless communication I/F 105a as much as possible.

When the communication-target device is not in a state that enables the execution of a Wi-Fi communication using the first wireless communication I/F 105a (S330: NO, or S830: NO), the CPU 106 can send, by using a WFD communication, via the second wireless communication I/F 105b, a Wi-Fi communication start instruction to the communication-target device (S340, S840). The Wi-Fi communication start instruction is information for instructing the communication-target device to configure a device status that enables the execution of a Wi-Fi communication. This makes it possible for the CPU 106 to send the MFP 51 a Wi-Fi communication start instruction using a WFD communication. That is, it becomes possible to use a low-priority WFD communication to configure the communication-target device to be able to execute a high-priority Wi-Fi communication.

When it has been determined that the default device and the second device are registered as the communication-target device (S815: YES and 5861: YES) but that the communication-target device is not in a state that enables the execution of a Wi-Fi communication (S860: NO), the CPU 106 can switch the communication path of the communication-target device to a WFD communication that uses the second wireless communication I/F 105b (S880). This makes it possible to ensure the redundancy of the communication path, thereby enabling a communication with the communication-target device to be executed reliably.

When it is determined that only the second device is registered as the communication-target device (S815: NO), the CPU 106 can display on the display module 102 information denoting that communication with the communication-target device is to be performed using a WFD communication (S820). When it is determined that the default device is registered as the communication-target device (S815: YES), the CPU 106 can display on the display module 102 information denoting that communication with the communication-target device is to be performed using a Wi-Fi communication (S865). This makes it possible to make the user aware of which of the first wireless communication I/F 105a and the second wireless communication I/F 105b is to be used.

<Second Embodiment>

The first embodiment described above was a mode in which, in a case that one device is detected as a Wi-Fi communication device and a WFD communication device, the CPU 106 configures the Wi-Fi communication device as the default devices (S220, S350), and configures the WFD communication device as the second device (S322). The second embodiment illustrates a mode in which, in the case that one device is detected as a Wi-Fi communication device and a WFD communication device, the CPU 106 configures the device whose existence was detected first as the default device. Since the configuration of the network 10 used in the second embodiment has already been explained in the first embodiment, an explanation will be omitted here.

In the second embodiment, S322*a* is executed instead of S322 of FIG. 4. In S322*a*, the CPU 106 determines whether or not a Wi-Fi communication device has already been registered as the default device. Specifically, the CPU 106 selects, from among photo printing 611 to scan 613 in the communication-target device table TB1 (FIG. 6), the row that corresponds to the use that was selected in S105. Then, the CPU 106 determines whether or not information denoting a Wi-Fi communication device is stored in the default device storage area 800 of the selected row. When the determination is negative, the CPU 106 configures a WFD communication device as the default device. When the determination is affirmative, the CPU 106 configures a WFD communication device as the second device.

Furthermore, in the second embodiment, S220*a* is executed instead of S220 of FIG. 3. In S220*a*, the CPU 106 determines whether or not a WFD communication device has already been registered as the default device. Specifically, the CPU 106 determines whether or not information denoting a WFD communication device is stored in the default device storage area 800 of the row corresponding to the use that was selected in S105 in the communication-target device table TB1 (FIG. 6). When the determination is affirmative, the CPU 106 reconfigures the WFD communication device, which is configured as the default device, to the second device. Then, the CPU 106 configures the Wi-Fi communication device as the default device. Specifically, in the communication-target device table TB1, the CPU 106 moves the information stored in the default device storage area 800 to the second device storage area 810. Then, the CPU 106 stores information denoting the Wi-Fi communication device in the default device storage area 800. Alternatively, when the determination is negative, the CPU 106 configures the Wi-Fi communication device as the default device.

In the second embodiment, S350*a* is executed instead of S350 of FIG. 4. The content of S350*a* is the same as the content of S220*a* described above, and therefore an explanation will be omitted here.

<Effects of Second Embodiment>

In a case that one device is detected as both the Wi-Fi communication device and the WFD communication device, when the one device has been detected as a WFD communication device prior to being detected as a Wi-Fi communication device, the CPU 106 can configure the WFD device as the default device. Then, when the one device has been detected as the Wi-Fi communication device thereafter, the CPU 106 can reconfigure the WFD device as the second device, and configure the Wi-Fi communication device as the default device. This makes it possible for the CPU 106 to configure a default device during a period when a Wi-Fi communication device has not been detected.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

<Modifications>

Figure 5A:
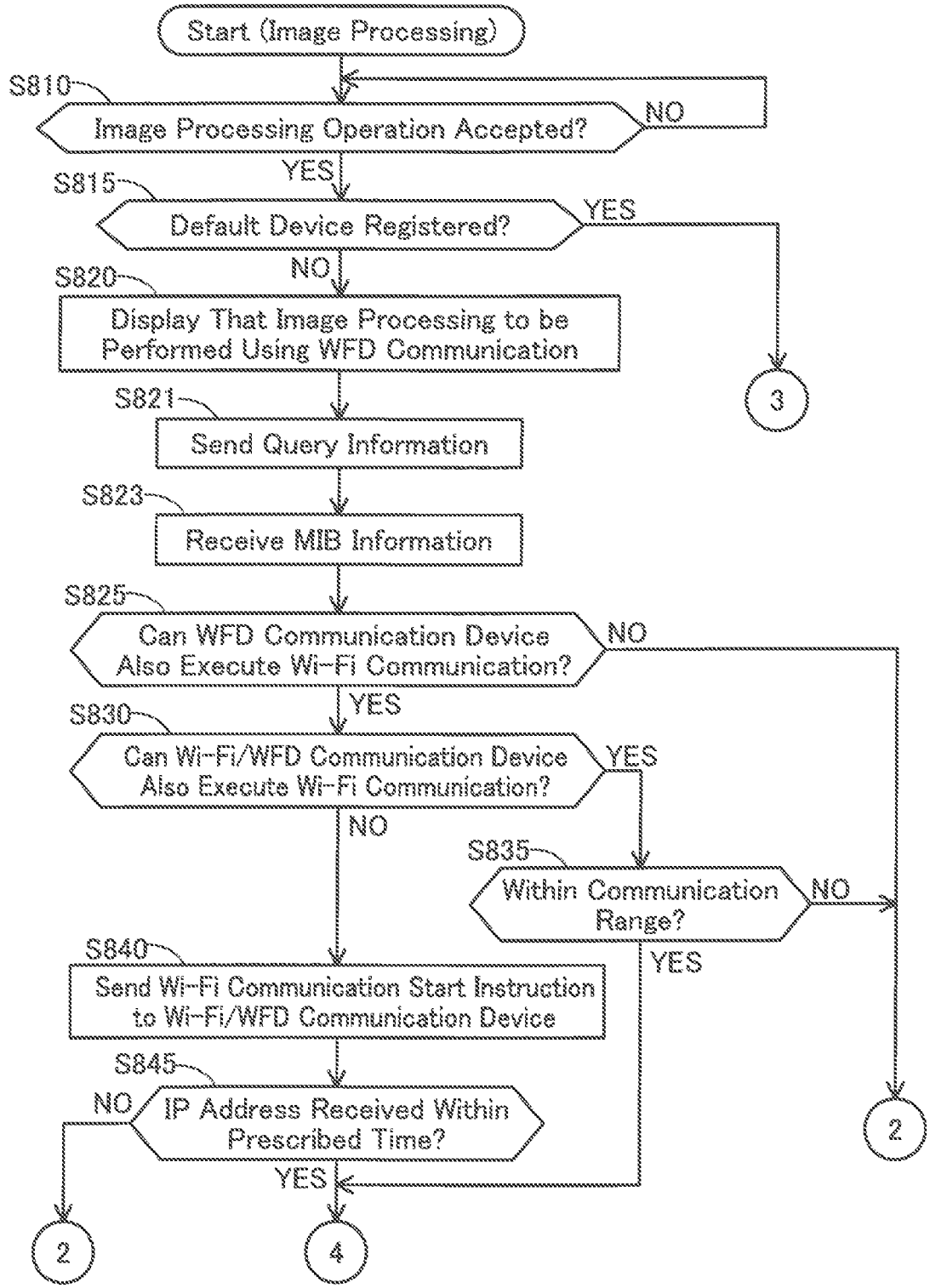
FIG. 5A shows a flowchart explaining image processing.
Figure 5B:
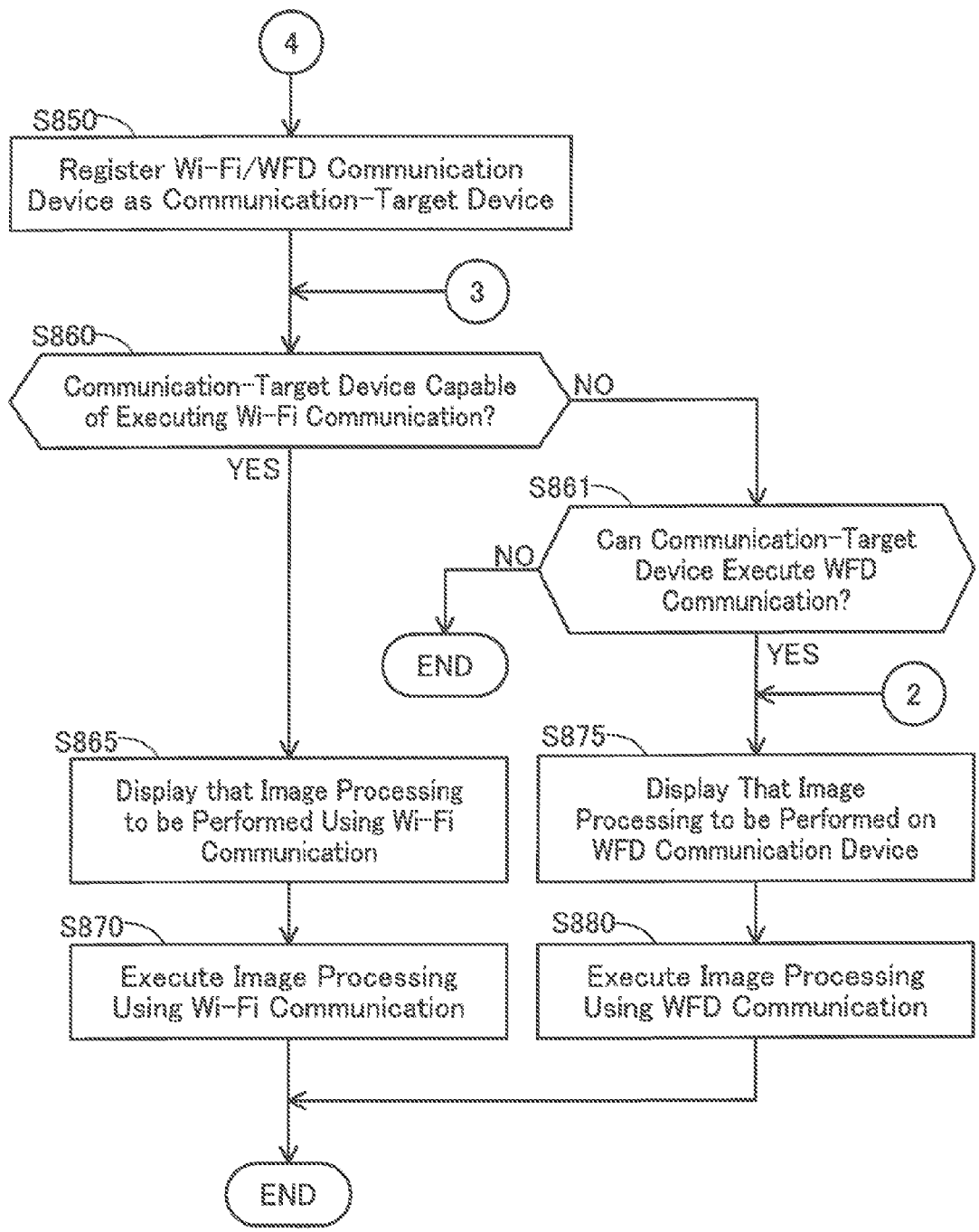
FIG. 5B shows a flowchart explaining image processing.

A case in which the image processing of FIG. 5A and FIG. 5B is commenced in response to a print process or scan process execution command having been inputted in S810 was explained, but the present invention is not limited to this aspect. The image processing of FIG. 5A and FIG. 5B may be commenced in accordance with a "preview button", which instructs the display of a preview of the acquired photo data, having been pressed on the "photo printing" operation screen. When the "preview button" has been pressed (S810: YES), a preview image of the print target is displayed on the display module 102. The print setting may or may not be reflected on the preview display at this time. Then, print processing may be commenced in response to a "print button" on the preview display screen being pressed. In the case of "web printing", the image processing of FIG. 5A and FIG. 5B may be commenced in accordance with the "preview button" for instructing the display of a preview of the acquired web page data having been pressed.

In the example explained in the present embodiment, a case in which a "photo printing" execution command is inputted in S810 as an execution instruction for processing for communicating a prescribed data (e.g.: print data) to the communication-target device was explained. However, the "execution instruction for processing for communicating a prescribed data" is not limited to an instruction by which, like the print execution instruction, a data communication is executed without user confirmation subsequent to the instruction. A specific instruction by which a data communication is executed after a confirmation instruction for confirming with the user whether or not a data communication may be executed subsequent to the instruction is included within the range of a "data communication processing execution instruction". A preview display instruction can be considered one example of an instruction by which a data communication is executed after a confirmation instruction. When the preview display instruction is performed, a display that previews the print-target data is performed. The print execution button is also displayed together with the preview display. The user confirms the preview display, and when printing is desired, touches the print button. When the print button is touched, the processing transitions to the execution of a print data communication.

In S850, the processing for configuring the Wi-Fi/WFD communication device as the default device may be a temporary process. For example, the CPU 106 may cause information such as the IP address 803 to be stored in the default device storage area 800 of the communication-target device table TB1 (S850). Then, after the processing of S870 and S880 has ended, the CPU 106 may delete the information that was stored in the default device storage area 800.

In the second embodiment, a mode for configuring both the default device and the second device was explained, but the present invention is not limited to this mode. There may also be a mode for storing only the default device. In this case, when the WFD communication device has already been registered as the default device in S220*a*, the CPU 106 may configure the Wi-Fi communication device as the default device in place of the WFD communication device. Specifically, the CPU 106 may store in an overwritten manner information denoting the Wi-Fi communication device in the default device storage area 800 of the communication-target device table TB1. Furthermore, in a case that the Wi-Fi communication device has already been registered as the default device in S322*a*, the CPU 106 need not cause the WFD communication device information to be stored in the communication-target device table TB1.

There may be a variety of methods for determining whether or not a WFD communication device is also a Wi-Fi communication device in S325. For example, the CPU 106 may execute this determination by comparing the MAC addresses. Specifically, the CPU 106 may execute the determination in accordance with whether or not the MAC address acquired in S320 and the MAC address of the Wi-Fi communication device stored in the storage 109 are a match. The MAC address of the Wi-Fi communication device is information that is stored in the storage 109 in S220. Because a MAC address is a physical address that can uniquely identify an external device, and, in addition, is commonly used information, the MAC address makes it possible to reliably execute a determination process.

In S210 and S320, a configuration that acquires information from an external device is not limited to a configuration that uses MIB information. The configuration may be such that an external device replies with various information as a response to an information acquisition request from the information processing apparatus 100.

The condition for sending a Wi-Fi communication start instruction in S340 can be configured in a variety of ways. For example, the CPU 106 may send a Wi-Fi communication start instruction (S340) when it has been determined that a Wi-Fi/WFD communication device is able to execute a Wi-Fi communication (S330: YES), and a history of a Wi-Fi communication previously executed with the Wi-Fi/WFD communication device remains in the storage 109. This makes it possible to prevent an unnecessary Wi-Fi communication start instruction from being sent.

In S345, the present invention may also have a mode for receiving the IP address of a Wi-Fi/WFD communication device via a Wi-Fi communication.

In S350, the CPU 106 stores the information needed for executing a WFD communication (e.g.: device ID, MAC address) in the storage 109 even in a case that a Wi-Fi communication is executed with a Wi-Fi/WFD communication device. This makes it possible to switch over from a Wi-Fi communication to a WFD communication using the device ID and MAC address in a case that a Wi-Fi communication is not able to be used with the Wi-Fi/WFD communication device (S860: NO). This enables the communication system to be provided with redundancy.

A plurality of default devices may be configured for each use. For example, there may be a first default device and a second default device. The application 121 may execute a communication with the first default device on a priority basis, and may communicate with the second default device when it is not possible to communicate with the first default device. Then, a Wi-Fi communication device may be stored in the communication-target device table TB1 as the first default device, and a WFD communication device may be stored in the communication-target device table TB1 as the second default device.

The processing for accepting the input of the communication-target device designation instruction in S110 can be omitted. In this case, when the determination in S105 is affirmative, the processing proceeds to S115. Furthermore, S160, S215, S321, and S346 may be omitted. The processing for determining whether or not the Wi-Fi/WFD communication device is within the Wi-Fi communication range (S335) can be omitted. In this case, when the determination in S330 is affirmative, the processing proceeds to S346. The processing for sending the Wi-Fi communication start instruction (S340) can be omitted. In this case, when the determination in S330 is negative, the processing may return to S125 of FIG. 2A. From the above, generally speaking, the information processing apparatus 100 may comprise at least "receiving first communication device identification information", "receiving second communication device identification information", "selecting a communication target device", "storing the received first communication device identification information", "storing the received second communication device identification information", "accepting an execution instruction", and "performing the communication". As a specific example, the information processing apparatus 100 may execute at least S115, S120, S110 or S165, S220 or S350 or S850, S322, S810, and S870 or S880.

The present invention is not limited to a configuration for registering a default device in the communication-target device table TB1 in S220, S322 and S350. For example, the user can register a default device by operating the touch panel 103 and inputting an IP address and the like.

The timing at which the application 121 acquires, from the OS 124, the SSID of the network to which the information processing apparatus 100 is currently connected is not limited to the timing of S315. For example, the SSID may be acquired at the timing at which a print preview is displayed, and/or at the timing at which the application 121 is started.

The value of the IP address and the character string of the SSID used in this embodiment are merely examples, and various values and character strings may be used.

The model name 801 may be anything so as long as they are able to differentiate the devices; for instance, they may be configured only from symbols without including numbers. Moreover, a name such as the device name capable of differentiating the devices may be used in substitute for the model name.

The information processing apparatus 100 may also be configured so that an external memory such as a memory card can be connected thereto. Furthermore, in substitute for the storage 109, a configuration of storing the various types of data in an external memory can be adopted.

While the MFP 51 was explained as an example of the image processing apparatus, the configuration is not limited thereto. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner creates data indicating the shape or movement of an object based on the output from a sensor. As an example of image data, moving image data or 3D image data may be used.

Each program may be constituted by a single program module or by a plurality of program modules. Each example may adopt another replaceable configuration which is within the context of the present invention. Adoptable configurations include a computer (the CPU 106 or the like) which executes processing based on a program (the print & scan application 121 or the like), a computer which executes processing based on a program other than an image processing program such as an operating system and other applications, a hardware configuration (the touch screen 103 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of program

The invention claimed is:

1. A non-transitory computer-readable storage medium storing a computer program for an information processing device configured to communicate with a plurality of devices, wherein the information processing device comprises:
a first wireless communication interface configured for communication in accordance with a first communication standard;
a second wireless communication interface configured for communication in accordance with a second communication standard that is different from the first communication standard;
a storage;
an operation unit; and
one or more processors,
wherein the computer program includes instructions for causing the one or more processors of the information processing device to perform:
receiving, via the first wireless communication interface, in a case that first communication device identification information is transmitted from a first communication device, the first communication device identification information for identifying the first communication device that can be communicated using the first wireless communication interface;
receiving, via the second wireless communication interface, in a case that second communication device identification information is transmitted from a second communication device, the second communication device identification information for identifying the second communication device that can be communicated using the second wireless communication interface;
storing the received first communication device identification information in the storage in a case that the first communication device identification information is received;
storing the received second communication device identification information in the storage in a case that the second communication device identification information is received;
selecting a communication target device that is to communicate with the information processing device from among the plurality of devices;
accepting, via the operation unit, an execution instruction for executing a process for performing a communication of data with the communication target device;
sending first inquiry information to a predetermined device via the second wireless communication interface in a case that only predetermined second communication device identification information is stored in the storage but first communication device identification information indicating that the predetermined device is the first communication device is not stored in the storage, the predetermined second communication device identification information is one of the second communication device identification information stored in the storage and indicates that the predetermined device is the second communication device;
receiving, via the second wireless communication interface, first response information sent from the predetermined device as a response to the first inquiry information, the first response information being sent in a case that the predetermined device is capable of communicating in accordance with the first communication standard;
storing the first communication device identification information indicating that the predetermined device is the first communication device when the first response information is received;
performing the communication with the communication target device via the first wireless communication interface in a case that particular first communication device identification information is stored in the storage, the particular first communication device identification information being the first communication device identification information of the first communication device that is the selected communication target device; and
performing the communication with the communication target device via the second wireless communication interface in a case that only the particular second communication device identification information is stored in the storage but the particular first communication device identification information is not stored in the storage, the particular second communication device identification information being the second communication device identification information of the second communication device that is the selected communication target device.

2. The non-transitory computer-readable storage medium according to claim 1, wherein
the computer program includes instructions for causing the one or more processors of the information processing device to further perform accepting a selection instruction for selecting the communication target device from among the devices identified by at least one of the first communication device identification information and the second communication device identification information,
the selecting of the communication target device is performed by selecting the device corresponding to the accepted selection instruction as the communication target device,
the predetermined device is the communication target device corresponding to the selection instruction, and
the sending of the first inquiry information to the communication target device via the second wireless communication interface is performed in a case that only the particular second communication device identification information is stored in the storage but the particular first communication device identification information is not stored in the storage.

3. The non-transitory computer-readable storage medium according to claim 2, wherein
the information processing device further comprises a display unit,
wherein the computer program includes instructions for causing the one or more processors of the information processing device to further perform:
causing the display unit to display information indicating that the communication with the communication target device is to be performed via the second wireless communication interface, the display being performed in a case that the selection instruction has been accepted and only the particular second communication device identification information is stored in the storage but the particular first communication device identification information is not stored in the storage; and causing the display unit to display information indicating that the communication with the communication target device is to be performed via the first wireless communication interface, the display being performed in the case that the first communication device identification information indicating that the communication target device is the first communication device is stored in the storage.

4. The non-transitory computer-readable storage medium according to claim 1, wherein the predetermined device is the selected communication target device, the sending of first inquiry information is executed when the execution instruction is accepted in the case that only the particular second communication device identification information is stored in the storage but the particular first communication device identification information is not stored in the storage.

5. The non-transitory computer-readable storage medium according to claim 4, wherein the computer program includes instructions for causing the one or more processors of the information processing device to further perform:

receiving, via the second wireless communication interface as a response to the first inquiry information, state information that is sent in a case that the communication target device is not capable of communicating in accordance with the first communication standard; and sending first instruction information to the communication target device via the second wireless communication interface in a case that the first response information and the state information have been received, the first instruction information being information for instructing the communication target device to become capable of communicating in accordance with the first communication standard, and the storing of the first communication device identification information is performed in a case that the first communication device identification information is received after the first instruction information has been sent.

6. The non-transitory computer-readable storage medium according to claim 1, wherein the computer program includes instructions for causing the one or more processors of the information processing device to further perform judging whether or not the communication with the communication target device can be performed via the first wireless communication interface, the judging being performed when the execution instruction is accepted in the case that the particular first communication device identification information is stored in the storage, and the communication with the communication target device via the second wireless communication interface is performed in a case that: the particular second communication device identification information is stored in the storage; and it is judged in the judging that the communication with the communication target device cannot be performed via the first wireless communication interface.

7. The non-transitory computer-readable storage medium according to claim 1, wherein the first communication standard is a standard defining a communication method for communication between terminals via a relay device, the first wireless communication interface is an interface configured for communication in accordance with the first communication standard, the second communication standard is a standard defining a communication method for communication directly between one terminal and another terminal functioning as a relay device, and the second wireless communication interface is an interface configured for communication in accordance with the second communication standard.

8. The non-transitory computer-readable storage medium according to claim 7, wherein the first communication standard is a standard complying with a Wi-Fi protcol, and the second communication standard is a standard complying with a Wi-Fi Direct protocol.

9. A non-transitory computer-readable storage medium storing a computer program for an information processing device configured to communicate with a plurality of devices, wherein the information processing device comprises:

a first wireless communication interface configured for communication in accordance with a first communication standard;

a second wireless communication interface configured for communication in accordance with a second communication standard that is different from the first communication standard;

a storage;

an operation unit; and one or more processors, wherein the computer program includes instructions for causing the one or more processors of the information processing device to perform:

receiving, via the first wireless communication interface, in a case that first communication device identification information is transmitted from a first communication device, the first communication device identification information for identifying the first communication device that can be communicated using the first wireless communication interface;

receiving, via the second wireless communication interface, in a case that second communication device identification information is transmitted from a second communication device, the second communication device identification information for identifying the second communication device that can be communicated using the second wireless communication interface;

storing the received first communication device identification information in the storage in a case that the first communication device identification information is received;

storing the received second communication device identification information in the storage in a case that the second communication device identification information is received;

sending first inquiry information to the second communication device identified by the second communication device identification information in the case that the second communication device identification information has been received;

receiving, via the second wireless communication interface, first response information sent from the second communication device as a response to the first inquiry information, the first response information being sent in a case that the second communication device is capable of communicating in accordance with the first communication standard;

storing the first communication device identification information in the storage when the first response information is received, the first communication device identification information identifying that the first communication device is identical to the second communication device from which the first response information has been sent;

selecting a communication target device that is to communicate with the information processing device from among the plurality of devices;

accepting, via the operation unit, an execution instruction for executing a process for performing a communication of data with the communication target device;

performing the communication with the communication target device via the first wireless communication interface in a case that particular first communication device identification information is stored in the storage, the particular first communication device identification information being the first communication device identification information of the first communication device that is the selected communication target device; and performing the communication with the communication target device via the second wireless communication interface in a case that only the particular second communication device identification information is stored in the storage but the particular first communication device identification information is not stored in the storage, the particular second communication device identification information being the second communication device identification information of the second communication device that is the selected communication target device.

10. The non-transitory computer-readable storage medium according to claim 8, wherein the computer program includes instructions for causing the one or more processors of the information processing device to further perform:

receiving, via the second wireless communication interface, state information that is sent in a case that the second communication device is not in state of being capable of communicating in accordance with the first communication standard; and sending second instruction information to the communication target device via the second wireless communication interface in a case that the first response information and the state information have been received, the second instruction information being information for instructing the communication target device to become capable of communicating in accordance with the first communication standard, and the storing of the first communication device identification information is performed in a case that the first communication device identification information is received after the second instruction information has been sent.

11. An information processing device configured to communicate with a plurality of devices, the information processing device comprising:

a first wireless communication interface configured for communication in accordance with a first communication standard;

a second wireless communication interface configured for communication in accordance with a second communication standard that is different from the first communication standard;

a storage;

an operation unit; and a control device configured to perform:

receiving, via the first wireless communication interface, in a case that first communication device identification information is transmitted from a first communication device, the first communication device identification information for identifying the first communication device that can be communicated using the first wireless communication interface;

receiving, via the second wireless communication interface, in a case that second communication device identification information is transmitted from a second communication device, the second communication device identification information for identifying the second communication device that can be communicated using the second wireless communication interface;

storing the received first communication device identification information in the storage in a case that the first communication device identification information is received;

storing the received second communication device identification information in the storage in a case that the second communication device identification information is received;

selecting a communication target device that is to communicate with the information processing device from among the plurality of devices;

accepting, via the operation unit, an execution instruction for executing a process for performing a communication of data with the communication target device;

sending first inquiry information to a predetermined device via the second wireless communication interface in a case that only predetermined second communication device identification information is stored in the storage but first communication device identification information indicating that the predetermined device is the first communication device is not stored in the storage, the predetermined second communication device identification information is one of the second communication device identification information stored in the storage and indicates that the predetermined device is the second communication device;

receiving, via the second wireless communication interface, first response information sent from the predetermined device as a response to the first inquiry information, the first response information being sent in a case that the predetermined device is capable of communicating in accordance with the first communication standard;

storing the first communication device identification information indicating that the predetermined device is the first communication device when the first response information is received;

performing the communication with the communication target device via the first wireless communication interface in a case that particular first communication device identification information is stored in the storage, the particular first communication device identification information being the first communication device identification information of the first communication device that is the selected communication target device; and performing the communication with the communication target device via the second wireless communication interface in a case that only the particular second communication device identification information is stored in the storage but the particular first communication device identification information is not stored in the storage, the particular second communication device identification information being the second communication device identification information of the second communication device that is the selected communication target device.

12. A method for controlling an information processing device configured to communicate with a plurality of devices, the information processing device comprising:
a first wireless communication interface configured for communication in accordance with a first communication standard;
a second wireless communication interface configured for communication in accordance with a second communication standard that is different from the first communication standard;
a storage; and
an operation unit, the method comprising:
receiving, via the first wireless communication interface, in a case that first communication device identification information is transmitted from a first communication device, the first communication device identification information for identifying the first communication device that can be communicated using the first wireless communication interface;
receiving, via the second wireless communication interface, in a case that second communication device identification information is transmitted from a second communication device, the second communication device identification information for identifying the second communication device that can be communicated using the second wireless communication interface;
storing the received first communication device identification information in the storage in a case that the first communication device identification information is received;
storing the received second communication device identification information in the storage in a case that the second communication device identification information is received;

selecting a communication target device that is to communicate with the information processing device from among the plurality of devices;
accepting, via the operation unit, an execution instruction for executing a process for performing a communication of data with the communication target device;
sending first inquiry information to a predetermined device via the second wireless communication interface in a case that only predetermined second communication device identification information is stored in the storage but first communication device identification information indicating that the predetermined device is the first communication device is not stored in the storage, the predetermined second communication device identification information is one of the second communication device identification information stored in the storage and indicates that the predetermined device is the second communication device;
receiving, via the second wireless communication interface, first response information sent from the predetermined device as a response to the first inquiry information, the first response information being sent in a case that the predetermined device is capable of communicating in accordance with the first communication standard;
storing the first communication device identification information indicating that the predetermined device is the first communication device when the first response information is received;
performing the communication with the communication target device via the first wireless communication interface in a case that particular first communication device identification information is stored in the storage, the particular first communication device identification information being the first communication device identification information of the first communication device that is the selected communication target device; and
performing the communication with the communication target device via the second wireless communication interface in a case that only the particular second communication device identification information is stored in the storage but the particular first communication device identification information is not stored in the storage, the particular second communication device identification information being the second communication device identifcation information of the second communication device that is the selected communication target device.

* * * * *